United States Patent [19]

Hwan et al.

[11] Patent Number: 4,819,132
[45] Date of Patent: Apr. 4, 1989

[54] ADJUSTABLE SPOILER WITH THIRD BRAKE LIGHT

[76] Inventors: Jau H. Hwan, 2F, No. 27, Lane 697, Duen-Hwa South Rd.; Chun S. Wu, 2F, No. 27, Alley 2, Lane 24, Duen-Hwan Rd., both of Taipei, Taiwan

[21] Appl. No.: 68,279

[22] Filed: Jul. 1, 1987

[51] Int. Cl.⁴ .............................. B60Q 1/00; B60J 9/00
[52] U.S. Cl. ........................................ 362/61; 362/80; 296/180.1; 296/91; 340/479
[58] Field of Search ................. 362/61.80, 74; 340/84, 340/87, 94; 296/15, 217, 91, 180.1, 180.2

[56] References Cited

U.S. PATENT DOCUMENTS 2,963,315  12/1960  Wilsdorf, Sr. ...................... 296/91
3,560,044  2/1971   Helm .................................. 296/91
4,159,843  7/1979   Crossman .......................... 296/15
4,662,671  5/1987   Davis .................................. 296/91
4,676,546  6/1987   Igel .................................... 296/217

FOREIGN PATENT DOCUMENTS 3116628  11/1982  Fed. Rep. of Germany ........ 296/15
2572045  4/1986   France ............................... 296/15
0160331  7/1986   Japan ................................. 362/80

Primary Examiner—Ira S. Lazarus
Assistant Examiner—D. M. Cox
Attorney, Agent, or Firm—Holman & Stern

[57] ABSTRACT

This disclosure concerns an Adjustable Motor Car Spoiler with a Third Brake Light. It is adaptable for mounting on cars of any width through the addition or removal of a number of extension inserts secured by rods to a central spoiler member. This gives it features of convenience and practicality.

6 Claims, 3 Drawing Sheets

ADJUSTABLE SPOILER WITH THIRD BRAKE LIGHT

BACKGROUND OF THE INVENTION

With the great strides in growth that industry and the economy have achieved, the quality of our lifestyle has likewise gone up, such as our means of transportation. Cars are becoming, more frequently, the replacement for walking. And in order to stabilize a vehicle that is moving, a spoiler is mounted in the rear. A third brake light is also installed in the rear of the vehicle to ensure safe driving. The driver in back will always be aware of the situation of the car in front, thus avoiding rear-end collisions.

Spoilers that are currently on the market are fixed in length and auto accessory manufacturers are obliged to make a particular spoiler for each type of car. Much storage space is needed and this means money sitting in the warehouse. Furthermore, ordinary brake lights in use are installed inside the car, behind the rear seat and the driver in back must look for the brake light through the rear windshield. These brake lights are also hard to install and the appearance of the car interior is marred. Having a 5-door car will deprive from mounting the brake light behind the rear seat and it must be installed on the rear windshield. When mounted on the rear windshield, it is still visible to the driver in back but when the car is driven or is backing up, the view of the driver is obstructed by the brake light. This makes the brake light very inconvenient and in order to solve this problem, the design of the brake light was carefully studied and it resulted in the invention of an adjustable Spoiler with third brake light.

The spoiler consists of various parts secured together with a connecting shaft by inserting the connecting shaft into both sides of a main spoiler and then combining inserts, wings and end pieces together to form a complete unit. The number of extension inserts used are decided by the width of the car trunk. Storage space is reduced and the spoiler can be used on cars of all sizes, making it the ultimate in practicality.

The main feature of this invention is that it offers a spoiler that is adjustable in length and can be mounted with a third brake light. So the main spoiler is designed for use as a brake light or with a reflector, making a brake light and spoiler in one. Both can then be mounted onto the car.

SUMMARY OF THE INVENTION

This invention is an adjustable Spoiler with Third Brake Light. It consists of a connecting shaft which permits the main spoiler to be connected with the extension inserts, commmpressor wings and end pieces to form one unit. The Spoiler can be adapted for use on any car simply by increasing or reducing the number of inserts used. The main spoiler can also be used as a third brake light or used with a reflector to avoid the trouble of installing another third brake light for the purpose of safe driving.

BRIEF DESCRIPTION OF THE PREFERRED EMBODIMENT

Figure 1:
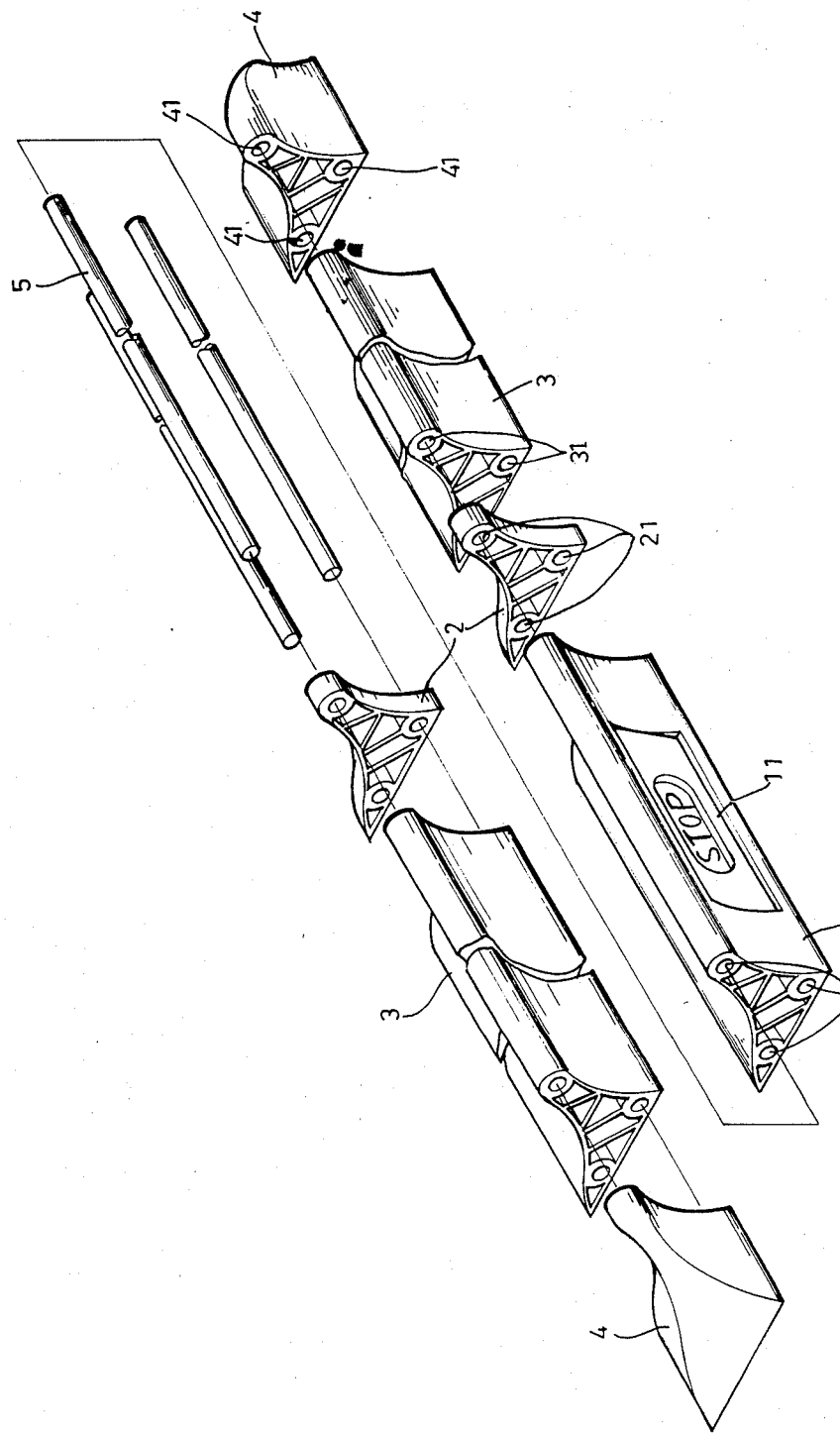
FIG. 1 is an exploded view of a spoiler according to the invention.

Please refer to FIG. 1. This invention is a main attachment (1) designed for use as a third brake light. Attached onto its surface is a transparent lens (11) and when not in use as a third brake light, a reflector can also be attached to the surface. Running along the length of the main attachment is a guide hole (12). The extension inserts (2) are thin sections that also have guide holes (21), as do the compressor wings (3) have guide holes (31) and the end attachments (4) have guide holes (41).

Figure 2:
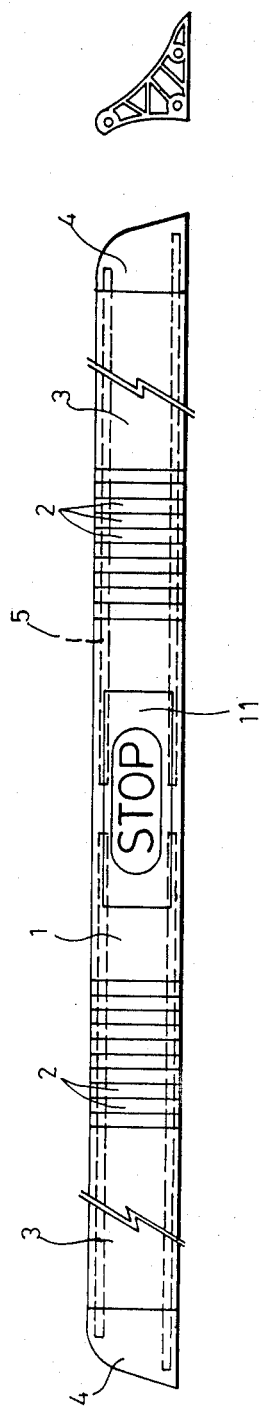
FIG. 2 is a frontal view of the spoiler.

For assembly, please refer to FIG. 2. The first step is to take connecting shafts or rods (5) and insert them into both sides of the main spoiler attachment (1); one shaft for each of the three guide holes (12). According to the width of the car, the appropriate number of extension inserts (2) can be connected to the main spoiler (1) by fitting the connecting shaft (5) through the guide holes (21).

Figure 3:
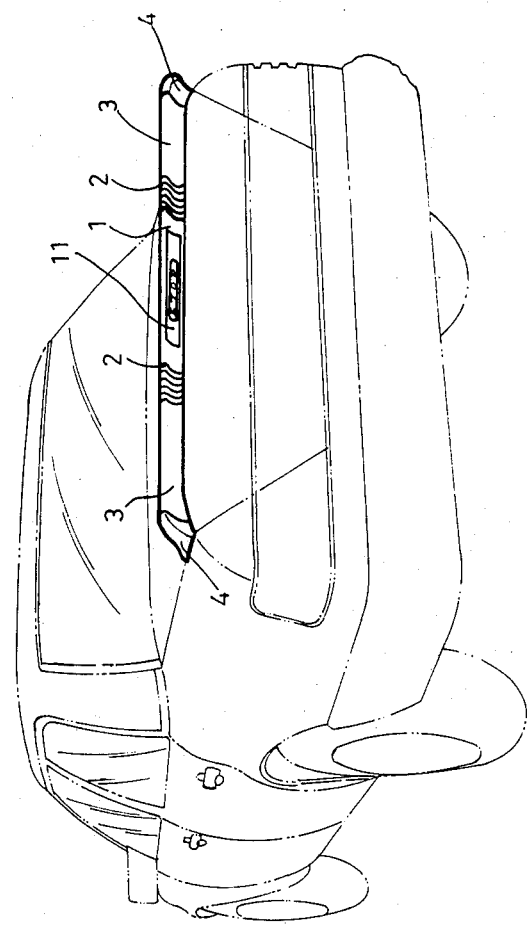
FIG. 3 is a perspective view of the spoiler mounted on a vehicle.

The two compressor wings (3) must then be attached to both sides of the main spoiler (1). The compressor wings (3) are connected through the fitting of the shaft (5) onto the guide holes (31). They are assembled next to the extension inserts (2) by fitting them through the shaft into the guide holes (41). This completes the whole assembly procedure. After following the above assembly instructions, the Spoiler can then be mounted onto the trunk of a car, as in FIG. 3, and it is ready for use.

What is claimed:

1. A spoiler structure for an automobile comprising a central spoiler member, respective rod elements extending from opposite ends of the central member, spoiler end members attached at the ends of the respective rod elements, and at least one intermediate spoiler member secured on the respective rod elements between each end member and the central member, whereby the length of the spoiler structure is determined by the number of intermediate spoiler members.

2. A structure as defined in claim 1 wherein there are plural intermediate members between each end member and the central member, the intermediate members including at least one compression member and at least one shorter extension member.

3. A structure as defined in claim 1 wherein there are three rod elements between the central member and each end member, the rod elements being located at respective apeces of a triangle.

4. A structure as defined in claim 1 wherein the intermediate members have through bores through which the respective rod elements extend, and the rod elements are releasably retained in respective further bores in the central member and end members.

5. A structure as defined in claim 1 wherein the central member includes a visual indicator device.

6. A structure as defined in claim 5 wherein the indicator is a brake light structure.

* * * * *